Stafford & Crossman,
Washing Machine,
Nº 51,977. Patented Jan. 9, 1866.
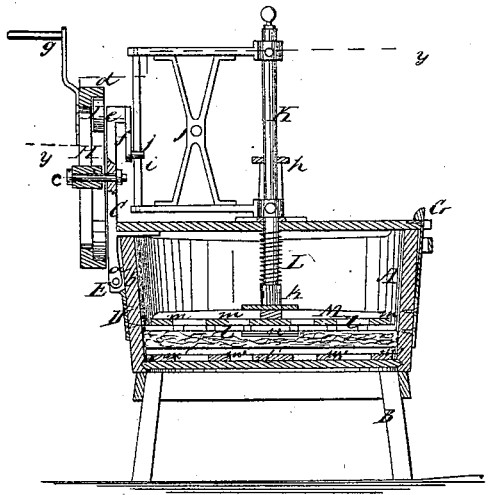
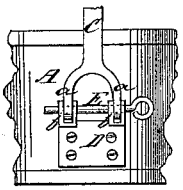
Fig. 3
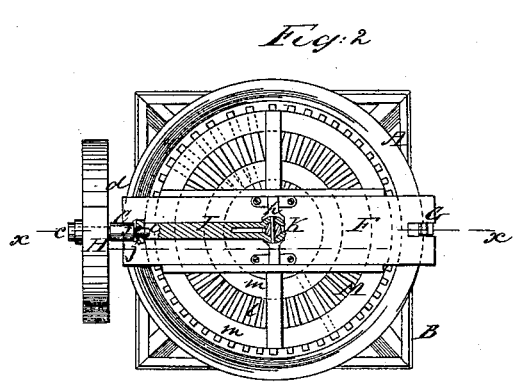
Fig. 2
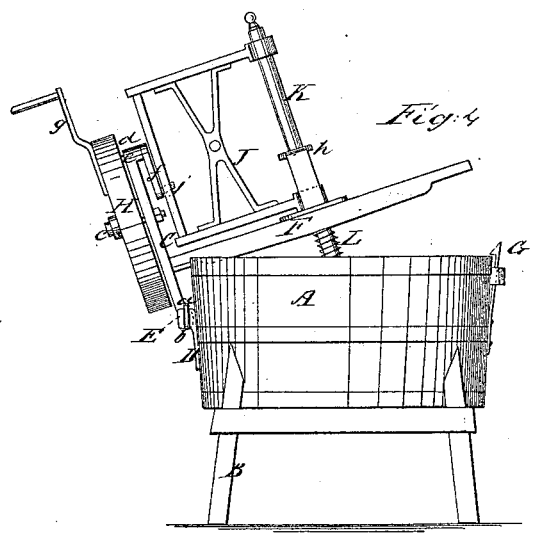
Fig. 4
Witnesses.
Jno. E. Lyon
Wm Treurn
Inventor
A. J. Stafford
J. Crossmann
By Munn & Co.
Attorneys

UNITED STATES PATENT OFFICE.

A. J. STAFFORD AND S. CROSSMAN, OF ESSEX, NEW YORK.

WASHING-MACHINE.

Specification forming part of Letters Patent No. 51,977, dated January 9, 1866.

*To all whom it may concern:*

Be it known that we, A. J. STAFFORD and S. CROSSMAN, of Essex, in the county of Essex and State of New York, have invented a new and Improved Clothes-Washing Machine; and we do hereby declare that the following is a full, clear, and exact description thereof, which will enable those skilled in the art to make and use the same, reference being had to the accompanying drawings, forming part of this specification, in which—

Figure 1 is a side-sectional view of our invention, taken in the line $xx$, Fig. 2; Fig. 2, a horizontal section of the same, taken in the line $yy$, Fig. 1; Fig. 3, a detached view of the joint by which the frame which supports the rubber shaft and rubber driving mechanism is connected to the tub; Fig. 4, a side view of the invention.

Similar letters of reference indicate like parts.

This invention relates to a new and improved clothes-washing machine of that class in which a rubber having a circular reciprocating motion is used in connection with a tub.

The invention consists in the peculiar means employed for giving motion to the rubber, and also in connecting the rubber and its driving mechanism to the tub, as hereinafter fully shown and described, whereby the rubber may be operated with the greatest facility and with but a moderate expenditure of power, and the rubber very readily removed out from the tub and adjusted therein, and also with its driving mechanism readily detached from the tub whenever required.

A represents a tub which is supported at a suitable height by any proper framing, B, and may be constructed substantially in the same manner as the ordinary wash-tub in use.

C is a metal bar, the lower end of which is forked and has its two prongs, $a\ a$, fitted in sockets $b\ b$ on the upper end of a metal plate, D, attached to the outer side of the tub, a rod, E, passing horizontally through holes in the lower ends of the prongs and through the sockets, so as to form a joint for the bar C to turn upon. To this bar C there is attached, at right angles, a board, F, which, when the device is ready or adjusted for use, is held in a horizontal position on the top of the tub by means of a spring-catch, G. To the bar C the axis $c$ of a wheel, H, is attached, and this wheel has a flange, $d$, projecting at right angles from its inner edge all around the wheel, and this flange bears upon a roller, I, the shaft $e$ of which has its bearing in the bar C and a crank, $f$, at its inner end. The wheel H has a handle, $g$, attached, for the convenience of turning of it, and motion is communicated to the roller I from the flange $d$ by friction. A toothed flange and pinion may be employed instead, but the friction arrangement we consider preferable.

J represents a rectangular metal frame one end of which is securely attached to a shaft, K, which passes through a bearing, $h$, on the board F, and also through the board. The opposite end of said frame has a vertical oblong slot, $i$, made in it, in which slot wrist-pin $j$ in the crank $f$ works. By this means a vibrating motion is communicated to the frame J and shaft K by the turning of the wheel H.

On the shaft K, below the board F, there is fitted a spiral spring, L, the upper end of which bears against the under side of board F, and the lower end upon a hub, $k$, on shaft K, or on the upper part of the rubber M. This rubber is of circular form, a trifle less in diameter than the interior of the tub, and it is composed of radial bars, $l$, secured to rings $m\ m$, a washer, $n$, being attached to the center of the rubber, at its under side, to prevent the bars $l$ from coming in contact with similar bars, $l'$, attached to the bottom of the tub, said bars $l'$ being secured in position by rings $m'\ m'$. These radial bars form the surface by which the clothes are subjected to the necessary friction, and the spaces between them admit of the water escaping freely from and passing through the texture of the clothes during the action of the rubber upon them, the necessary friction being given by the spring L.

In order to place the clothes in the tub, the board F is released from the tub and raised upward (see Fig. 4) until the rubber is out from the tub. The clothes are then placed in the tub, the board F secured by the catch G, and the wheel H turned, which causes the rubber to have a circular reciprocating motion, and, in connection with the pressure produced by spring L, operate upon the clothes in the most efficient manner.

When the device is to be removed to the place where it is kept when not in use the rubber and its driving mechanism are detached from the tub by withdrawing the rod E of the joint which connects the bar C with the tub. This will prove to be an advantage, especially in those cases where there is but a single person to carry or move the tub.

Having thus described our invention, we claim as new and desire to secure by Letters Patent—

1. The frame J, with the rubber shaft K attached, in connection with the driving-wheel H and roller I, or equivalent gearing, and the crank $f$, provided with a wrist-pin, $j$, which works in an oblong vertical slot in the outer end of frame J, all arranged, substantially as shown and described, to give a circular reciprocating motion to the rubber M.

2. The attaching of the bar C, to which the driving-wheel H is connected, to the tub A by means of a joint or hinge, and the connecting of the board F to said bar C for the purpose of admitting of the ready adjustment of the rubber in the tub, admits withdrawal therefrom, substantially as set forth.

3. The combination of the tub A, rubber M, frame J, and the rubber driving mechanism, composed of the wheel H, roller I, or equivalent gearing, and the crank $j$, provided with the wrist-pin $k$, fitted in the slot $i$ of frame J, all arranged to operate substantially as and for the purpose set forth.

The above specification of our invention signed by us the 14th and 27th days of November, respectively.

A. J. STAFFORD.
     S. CROSSMAN.

Witnesses for Stafford:
 M. M. LIVINGSTON,
 WM. DEAN OVERELL.

Witnesses for Crossman:
 V. P. NOYES,
 W. H. S. WHITCOMB.